(12) United States Patent
Brunneke et al.

(10) Patent No.: US 7,487,957 B2
(45) Date of Patent: Feb. 10, 2009

(54) PNEUMATIC SPRING VIBRATION DAMPER ASSEMBLY UNIT

(75) Inventors: Hans-Gerd Brunneke, Georgsmarienhuette (DE); Christian Loesche, Stemwede (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 243 days.

(21) Appl. No.: 11/571,545

(22) PCT Filed: Jul. 1, 2005

(86) PCT No.: PCT/DE2005/001159

§ 371 (c)(1),
(2), (4) Date: Jan. 2, 2007

(87) PCT Pub. No.: WO2006/005299

PCT Pub. Date: Jan. 19, 2006

(65) Prior Publication Data

US 2007/0246316 A1    Oct. 25, 2007

(30) Foreign Application Priority Data

Jul. 2, 2004    (DE) .................. 10 2004 032 411

(51) Int. Cl.
*F16F 9/04* (2006.01)
(52) U.S. Cl. .............. 267/64.24; 267/64.27; 267/64.19; 267/122; 267/64.21; 188/322.22; 188/321.11
(58) Field of Classification Search .............. 267/64.27, 267/64.19, 122, 64.21, 64.23, 64.26; 188/322.22, 188/321.11
See application file for complete search history.

(56) References Cited

U.S. PATENT DOCUMENTS

| | | | | |
|---|---|---|---|---|
| 2,379,388 A | * | 6/1945 | Thornhill | 267/64.15 |
| 3,638,769 A | | 2/1972 | Cohen | |
| 4,325,541 A | | 4/1982 | Korosladanyi et al. | |
| 5,996,980 A | * | 12/1999 | Frey et al. | 267/64.27 |
| 7,226,045 B2 | * | 6/2007 | Brookes | 267/64.27 |

FOREIGN PATENT DOCUMENTS

DE    199 59 839 A1    7/2000

* cited by examiner

*Primary Examiner*—Melanie Torres
(74) *Attorney, Agent, or Firm*—McGlew and Tuttle, P.C.

(57) ABSTRACT

A pneumatic spring-vibration damper unit is provided for absorbing shocks on wheels and chassis parts of motor vehicles. A variable air chamber is delimited by a rolling bellows which is disposed between a first subassembly that is fixed to the vehicle body and is provided with a vibration damper system and a second subassembly that is fixed to the vehicle chassis and is movable therewith. A piston rod connects the first subassembly located at the vehicle body end and the second subassembly located at the chassis end and whose free end located at the vehicle body end is accommodated inside a cylinder tube of the vibration damper system so as to be longitudinally movable by means of a piston. The piston rod (8) is guided within the cylinder tube (6) of the vibration damper system (2) so as to be longitudinally movable with the aid of a drag bearing arrangement (13). This allows the longitudinal axis of the piston rod to be angularly deflected relative to the central longitudinal axis (18) of the cylinder tube (6) while a joining element (10) which is fastened to the piston rod (8) and the piston (9) by a respective ball-and-socket joint unit (11, 12) is positioned between the piston rod (8) and the piston (9).

20 Claims, 4 Drawing Sheets ns at the inner guide surface of the continuous recess.

PNEUMATIC SPRING VIBRATION DAMPER ASSEMBLY UNIT

CROSS REFERENCE TO RELATED APPLICATIONS

This application is a United States National Phase application of International Application PCT/DE2005/001159 and claims the benefit of priority under 35 U.S.C. § 119 of German Patent Application DE 10 2004 032 411.5 filed Jul. 2, 2004, the entire contents of which are incorporated herein by reference.

FIELD OF THE INVENTION

The present invention pertains to a pneumatic spring vibration damper assembly unit for the suspension of wheels and chassis components of motor vehicles, with a variable air chamber limited by a roll bellows, in which the roll bellows is arranged between a first assembly unit, which is fixed on the body side and is provided with a vibration damper system, and a second assembly unit, which is fixed to the chassis of the motor vehicle and is able to move together with same.

BACKGROUND OF THE INVENTION

Such an assembly unit is known, for example, from DE 199 59 839 A1. A pneumatic spring combined with a vibration damper system is described there, in which pneumatic spring a cylinder tube, in which the piston connected to a piston rod is movably accommodated, is sealed by means of a special seal against the air space of the pneumatic spring. The special elastic manner of sealing permitting small motions of the cylinder tube deviating from the usual mean perpendicular.

It proved to be disadvantageous in the existing constructions that due to possibly occurring displacements between the assembly units mentioned, the piston rod connecting the body-side assembly unit to the chassis-side assembly unit is frequently subject under normal operating conditions to bending loads, which lead, due to the piston being connected to the piston rod, to increased friction in the cylinder tube of the vibration damper system, and, as a result hereof, to a poorer response characteristic of the vibration damper system.

In addition, design solutions are known according to the state of the art, in which a mount of the cylinder tube arranged on the outside at the cylinder tube is subject to extraordinarily strong forces, especially in case of high loads on the spring, at which the air space of the pneumatic spring is compressed to the extent that an existing chassis-side stop of the pneumatic spring comes into contact with the body-side assembly unit located opposite. In connection with the usual situations occurring during operation, this leads, as a rule, prematurely to impairment or failure of the pneumatic spring vibration damper assembly units known from the state of the art.

SUMMARY OF THE INVENTION

Based on these drawbacks known from the state of the art, the object of the present invention is to improve a pneumatic spring vibration damper assembly unit of this type such that the service life of such devices can be significantly prolonged based on improved force transmission within the assembly unit.

According to the invention, a pneumatic spring vibration damper assembly unit is provided for the suspension of wheels and chassis components of motor vehicles, with a variable air chamber limited by a roll bellows, in which the roll bellows is arranged between a first assembly unit, which is fixed on the body side and is provided with a vibration damper system, and a second assembly unit, which is fixed to the chassis of the motor vehicle and is able to move together with same. A piston rod connects the first, body-side assembly unit and the second, chassis-side assembly unit, and which is accommodated at its body-side free end by means of a piston in the interior space of a cylinder tube of the vibration damper system in a longitudinally displaceable manner. The piston rod within the cylinder tube of the vibration damper system is guided longitudinally displaceably by means of a drag bearing arrangement, which makes possible angular deflections of the longitudinal axis of the piston rod in relation to the central longitudinal axis of the cylinder tube, and that a connecting element, which is fixed to the piston rod and to the piston by means of a ball-and-socket joint each, is arranged between the piston rod and the piston.

The connection of the drag bearing arrangement and the connecting element present between the piston rod and the piston makes it possible for the piston rod, as a consequence of displacements of the chassis-side assembly units, to which the piston rod is fixed, to be able to follow these displacements, without being subject to bending. The displacement of the chassis-side assembly unit rather leads to an angular deflection of the longitudinal axis of the piston rod in relation to the central longitudinal axis of the cylinder tube. However, the piston connected to the piston rod can continue to run easily within the cylinder tube due to the design according to the present invention, so that rapid response characteristic of the vibration damper system is guaranteed.

In addition, the forces introduced into the pneumatic spring vibration damper assembly unit from the chassis can be transmitted directly due to the design according to the present invention at an end stop of the chassis-side assembly unit at the body-side assembly unit as a consequence of strong compression of the air volume within the air chamber, which air volume is located between the assembly units and is limited by the roll bellows, without the mounting of the piston rod according to the present invention being affected thereby. This fact arises from the fact that the position of the drag bearing arrangement in the interior of the cylinder tube belonging to the vibration damper system is changed compared to the state of the art.

As a special embodiment variant of the drag bearing arrangement, it proved to be especially advantageous that this drag bearing arrangement has a bearing inner part, which is provided with a continuous recess adapted to the cross section of the piston rod, with a round outer contour of varying cross section in the form of a convex outer shape, which is surrounded by a bearing outer part with a corresponding concave inner recess adapted to the outer contour of the bearing inner part. This special drag bearing arrangement guarantees, similarly to a ball sleeve joint, easy pivoting of the piston rod out of the usual central longitudinal axis of the cylinder tube, and easy displaceability of the piston rod is also guaranteed at the same time. In addition, it may be advantageous to manufacture the bearing inner part of the drag bearing arrangement of a plastic in order to additionally reduce frictional losses.

Corresponding to another advantageous embodiment, one or more sealing elements, which guarantee separation of the air chamber formed by the roll bellows from the interior space of the cylinder tube, are arranged in the continuous recess of the bearing inner part for guiding the piston rod. These sealing elements can be advantageously designed as elastic sealing rings, which are arranged in two circular, groove-like depressions at the inner guide surface of the continuous recess.

In addition, corresponding to an advantageous variant, at least one sealing element, which may likewise be designed as an elastic sealing ring, which is arranged in a circular groove of the inner guide surface of the concave inner extension of the bearing outer part, is arranged between the bearing inner part and the bearing outer part.

Moreover, the reach-through opening for the piston rod may be provided with a sealing element with elastic sealing lips as an additional sealing element at the end of the cylinder tube of the vibration damper system, which said end faces the air chamber, wherein the elastic sealing lips can follow, as circular elements being in contact with the piston rod surface, the pivoting motion of the piston rod from the central longitudinal axis of the cylinder tube. The cylinder tube is thus reliably sealed against the air chamber of the pneumatic spring vibration damper assembly unit even in case of greater pivoting motions of the piston rod.

Corresponding to another advantageous embodiment of the subject of the present invention, the piston rod may be accommodated at the second chassis-side assembly unit in another drag bearing arrangement, which makes possible small angular deviations of the central axis of the piston rod at right angles to the plane of fastening of the chassis-side assembly unit.

It proved to be advantageous to use a ball sleeve joint as the drag bearing arrangement from the viewpoint of design as well as from economic points of view.

To further increase the pivot angle of the piston rod in a plane of motion, it may be advantageous in another special embodiment to design the vibration damper system with its essential components, namely, the cylinder tube, the piston and the drag bearing arrangement for the piston rod, with an oval cross section. The greatest plane of pivoting of the piston rod is in the cross section plane with the greatest cross section extension of the oval or elliptical cylinder tube in this case.

Two exemplary embodiments of the subject of the present invention will be described in more detail below on the basis of two figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
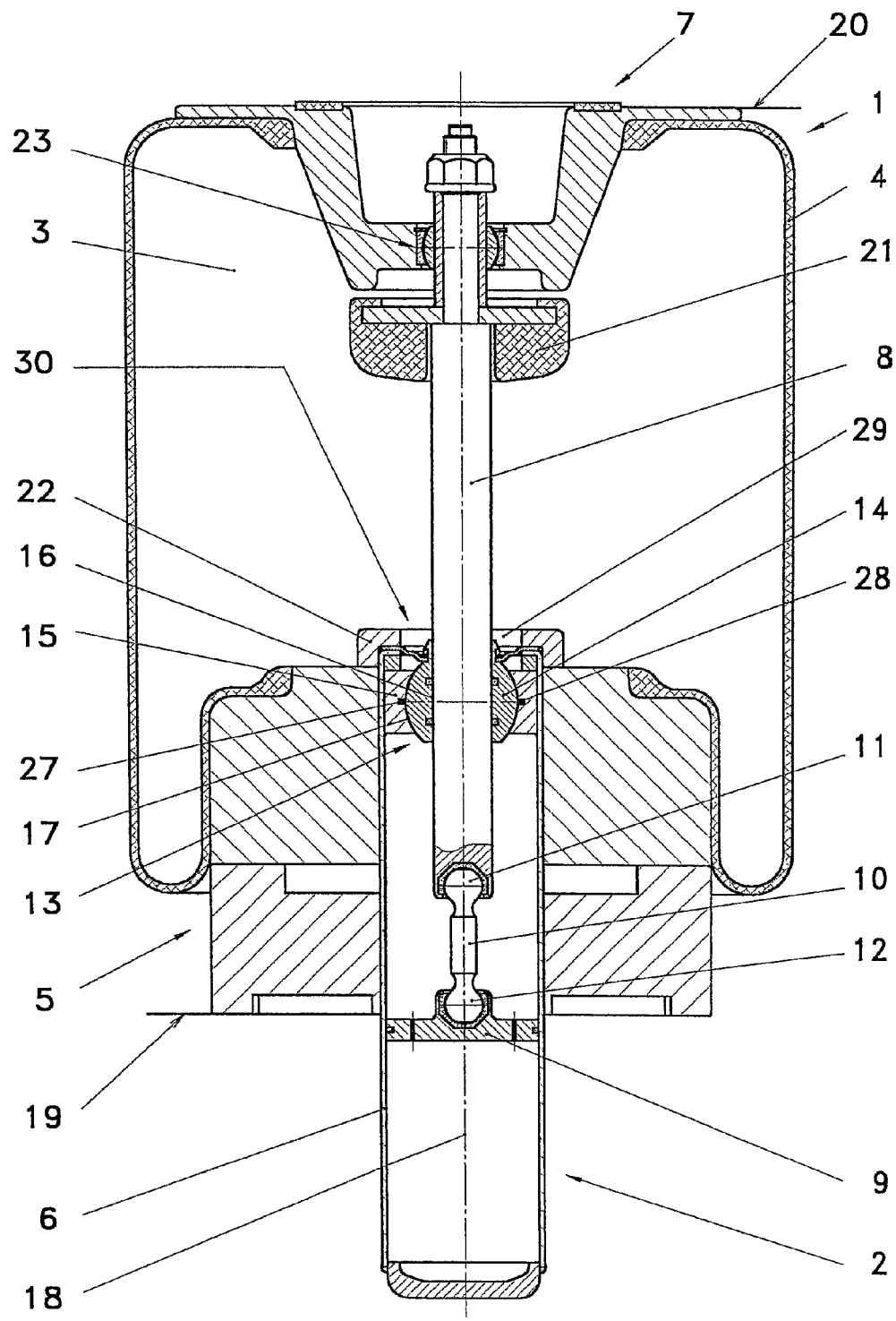
FIG. 1 is a sectional view through a pneumatic spring vibration damper assembly unit according to the present invention in the neutral position.

Referring to the drawings in particular, FIG. 1 shows a pneumatic spring 1 as an assembly unit together with a vibration damper system 2. The pneumatic spring 1 comprises essentially two assembly units, which are movable in relation to one another, the first assembly unit 5 being fixed to the motor vehicle on the body side and accommodating a cylinder tube 6 of the vibration damper system 2, and a chassis-side assembly unit 7, which is fixed, for example, to a wheel suspension of a motor vehicle. The roll bellows 4 that sealingly connects the aforementioned two assembly units 5 and 7 to one another leads to the formation of an air chamber 3 with variable volume between the components. This air chamber is filled with compressed air, which forms the suspension medium of the pneumatic spring. The body-side assembly unit 5 and the chassis-side assembly unit 7 are connected, corresponding to FIG. 1, by a piston rod 8, which is provided at its lower, body-side end with a piston 9, which is mounted within the cylinder tube 6 of the vibration damper system 2 in the usual manner in such a way that it is displaceable in a translatory manner. A connecting element 10, which has a ball-and-socket joint 11 and a ball-and-socket joint 12 at its respective two ends for connection to the piston rod 8 and to the piston 9, respectively, is located between the end of the piston rod 8 and the piston 9 as a feature of the pneumatic spring vibration damper assembly unit that is essential for the present invention.

A drag bearing arrangement 13, by which the piston rod 8 is guided within the cylinder tube 6 and within the body-side assembly unit 5, is located in the upper area of the cylinder tube 6, i.e., facing the chassis-side assembly unit 7. The drag bearing arrangement 13 comprises essentially a bearing inner part 14 with a continuous recess 16, which is fitted to the cross section of the piston rod in its upper cross section. The outer contour of the bearing inner part 14 has a circular cross section, the cross sections in the axial longitudinal direction of the piston rod 8 varying such that the form of a convex outer shape is obtained. The outer contour of the bearing inner part 14 is surrounded by a bearing outer part 15, which has a corresponding concave inner recess 17 adapted to the outer contour of the bearing inner part 14.

The shape of the bearing inner part 14 and the bearing outer part 15 resembles a ball sleeve joint and makes it possible, combined with the connecting element 10 of the piston rod 8, to perform angular deflections in relation to the central longitudinal axis 18 of the cylinder tube 6. This angular deflection is brought about in usual operating states of the pneumatic spring vibration damper assembly unit whenever the plane of fastening 19 of the body-side assembly unit 5 and the plane of fastening 20 of the chassis-side assembly unit 7, which are usually located overlappingly one on top of another, are displaced in relation to one another. This may happen due to a parallel displacement of the planes of fastening 19 and 20 or due to a tilting motion.

Figure 2:
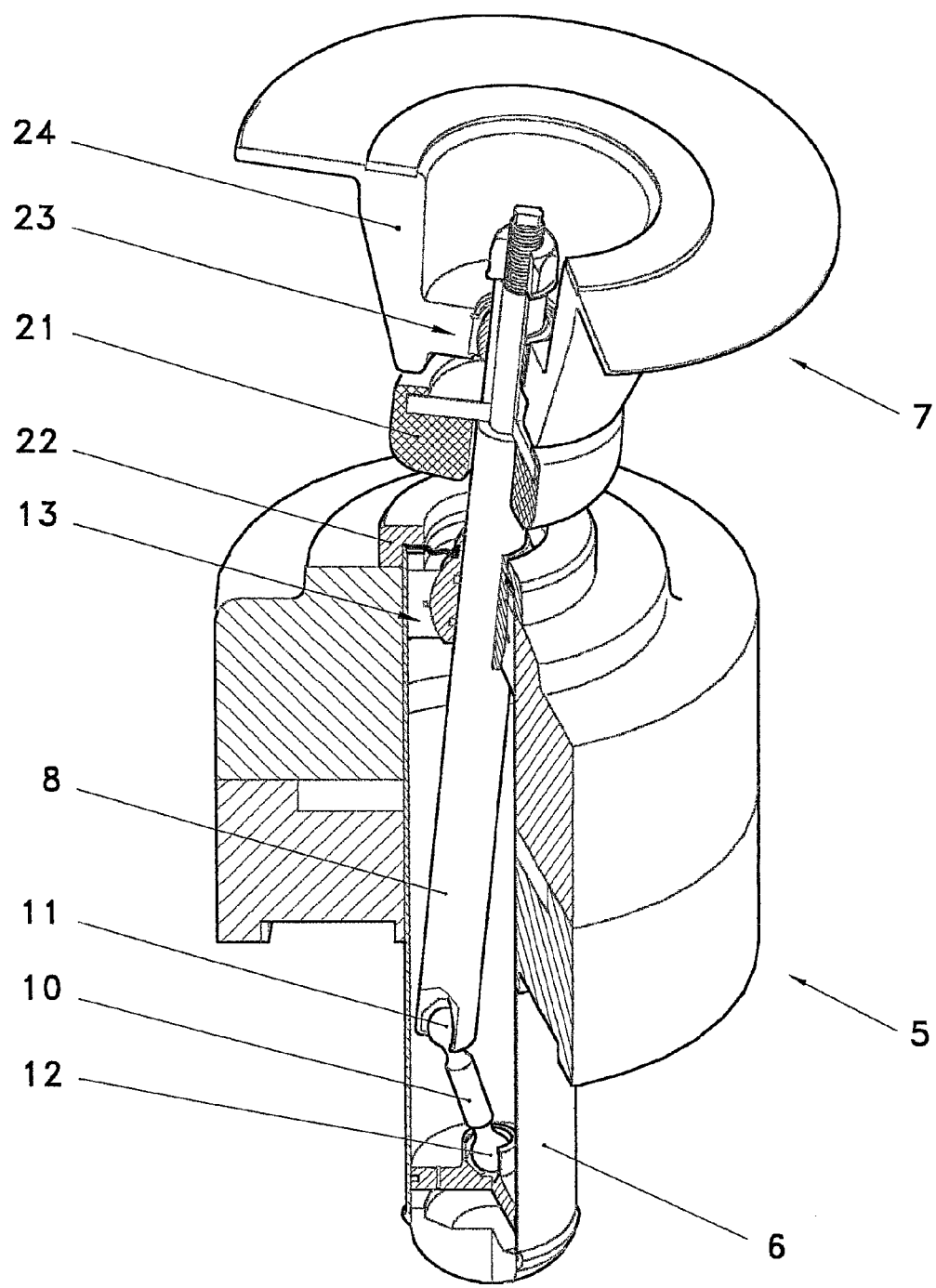
FIG. 2 is a partially cut-away perspective view of the pneumatic spring vibration damper assembly unit according to FIG. 1 in the pivoted state of the piston rod and in the stop position of the chassis-side assembly unit at the body-side assembly unit.

FIG. 2 shows such a tilting motion, wherein the roll bellows 4 is not shown to better illustrate the components of the pneumatic spring vibration damper assembly unit that are located on the inside. Moreover, FIG. 2 shows an operating situation in which the air chamber 3 acting as a spring element is compressed to the extent that a stop element 21 present on the underside of the chassis-side assembly unit 7 comes into contact with a stop plate 22 present on the top side of the body-side assembly unit 5. The chassis forces transmitted from the chassis-side assembly unit 7 via the stop element 21, which is advantageously manufactured from an elastic material, are now introduced directly into the body-side assembly unit 5 via the stop plate 22. Stressing of the drag bearing arrangement is thus ruled out.

To make possible greater tilting motions of the chassis-side assembly unit 7 or the plane of fastening thereof even in relation to the piston rod 8, it can be additionally seen in FIGS. 1 and 2, corresponding to an advantageous variant of the idea of the invention, that the piston rod 8 is accommodated in an additional drag bearing arrangement 23 in its upper fastening area at the chassis-side assembly unit 7. The drag bearing arrangement 23 is designed as a ball sleeve joint in the exemplary embodiment being shown and makes possible an additional tilting motion of a fastening element 24 belonging to the chassis-side assembly unit 7 in relation to the piston rod 8. Other drag bearing arrangements are, of course, conceivable as well.

FIG. 2 additionally shows the maximum angular deflection of the piston rod 8 in relation to the central longitudinal axis of the cylinder tube 6. The connecting element 10 makes it possible now, as can be clearly determined from FIG. 2, to connect the piston rod 8 to the piston 9 without problems based on the ball-and-socket joints 11 and 12.

The view—especially in FIG. 1—in the area of the drag bearing arrangement 13 shows, moreover, that two circular, groove-like depressions, in which an annular sealing element each, for example, in the form of an elastic O-ring, is arranged, are located in the continuous recess 16 of the bearing inner part 14. The sealing elements located in the grooves are used to seal the gap between the drag bearing arrangement 13 and the piston rod 8.

Moreover, the gap between the bearing inner part 14 and the bearing outer part 15 is sealed against the air chamber 3 of the pneumatic spring vibration damper assembly unit by means of a sealing element 27. The sealing element 27 is arranged, analogously to the sealing elements discussed above, in a groove 28, which is located circularly at the inner guide surface of the concave inner recess 17 of the bearing outer part 15.

In addition, the air chamber 3 is sealed by means of another sealing element 30 against the drag bearing arrangement 13 in the area of the reach-through opening 29 on the top side of the cylinder tube 6. The sealing element 30 has elastic sealing lips, which are able to follow the possible pivoting motion of the piston rod 8 from the central longitudinal axis 18 of the cylinder tube 6 as circular contact elements being in contact with the surface of the piston rod.

Figure 3:
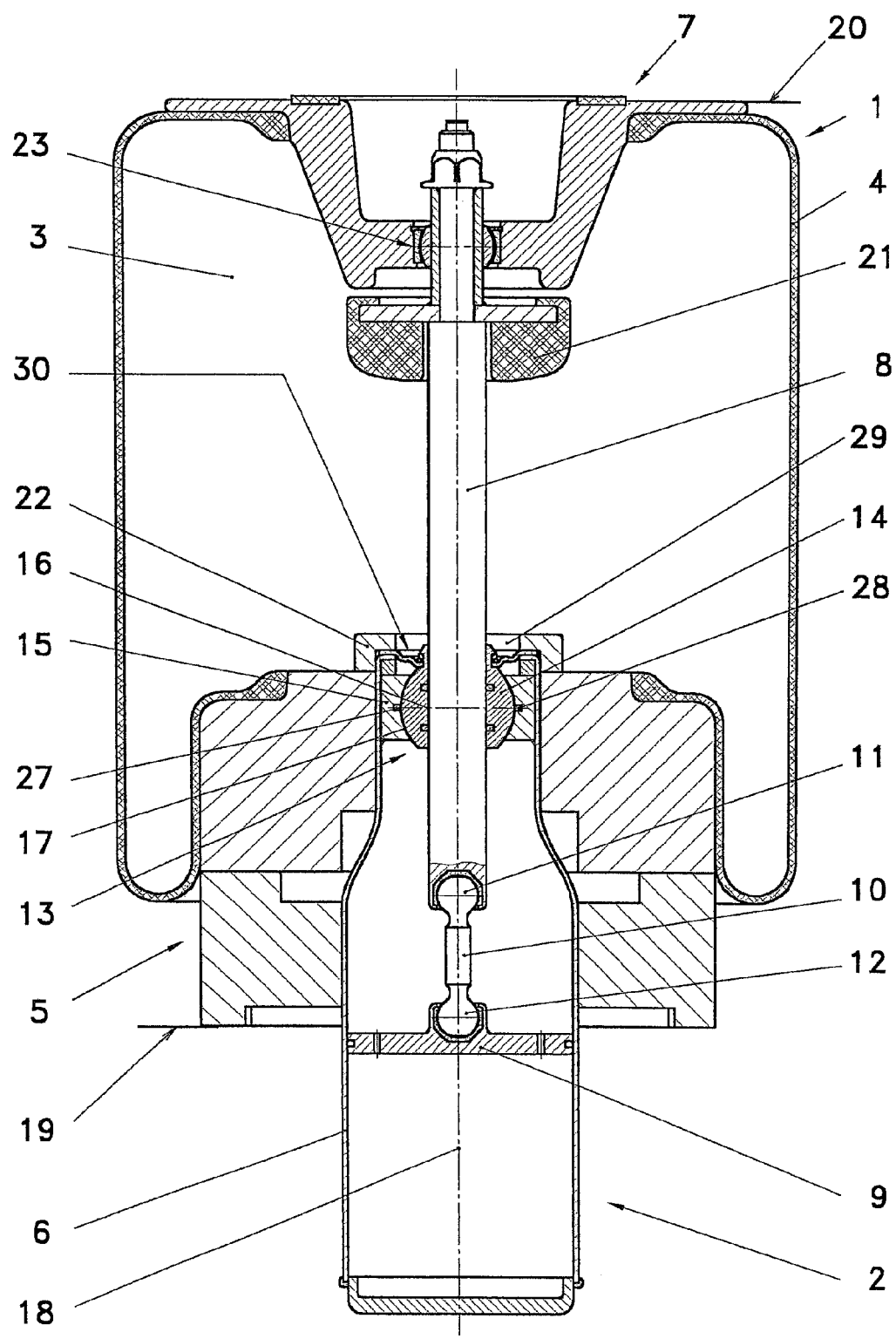
FIG. 3 is a sectional view of another embodiment variant of the pneumatic spring vibration damper assembly unit according to the present invention in the neutral position.
Figure 4:
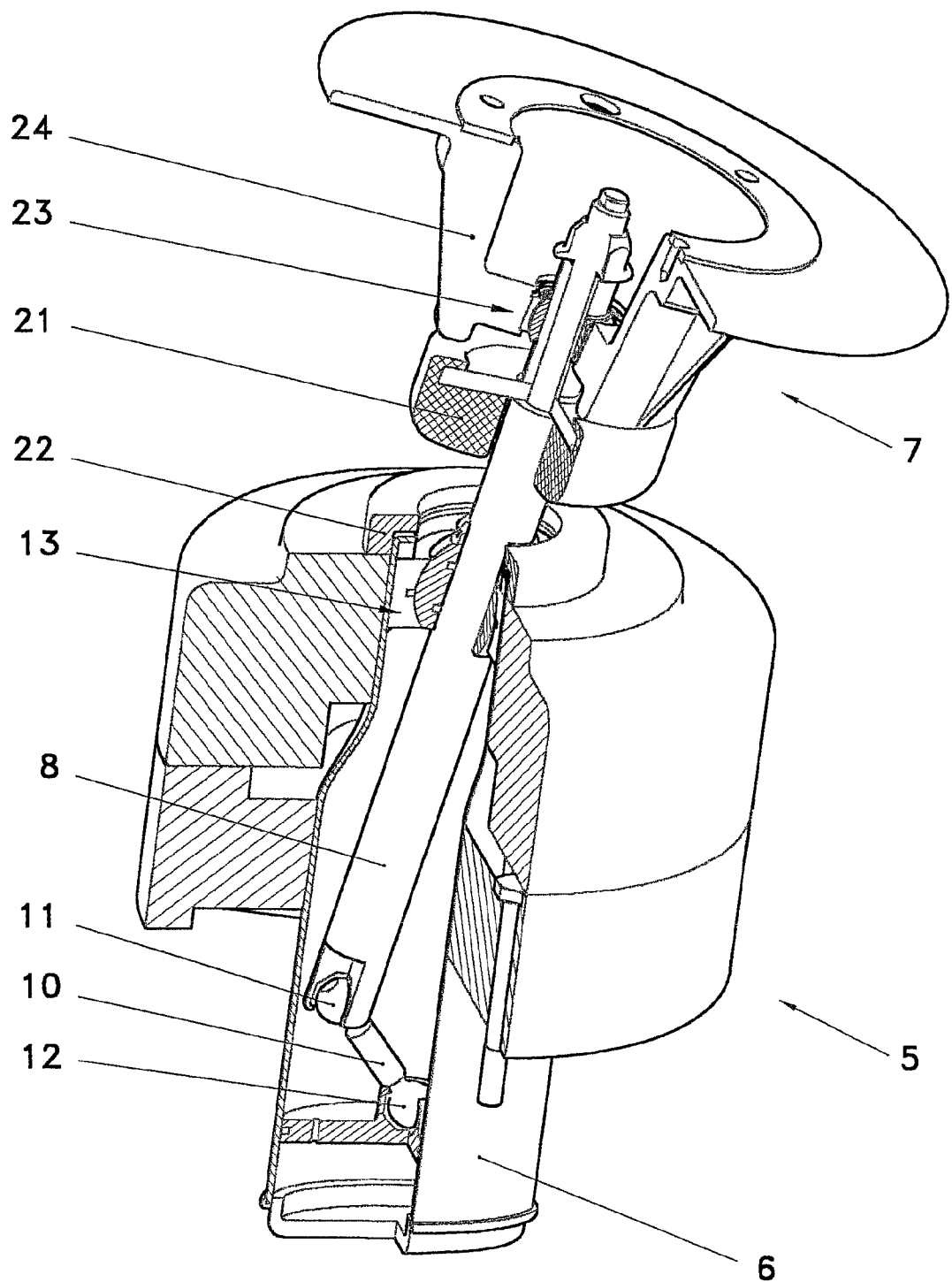
FIG. 4 is a partially cut-away perspective view of the pneumatic spring vibration damper assembly unit according to FIG. 3 in the pivoted state of the piston rod and in the stop position of the chassis-side assembly unit at the body-side assembly unit.

The view in FIGS. 3 and 4 shows another embodiment variant of the subject of the present invention, which corresponds in essential elements of the body-side assembly unit 5 as well as the chassis-side assembly unit 7 to the first exemplary embodiment described above. The identical components of the two variants will not therefore be discussed once again in detail here. The reference numbers used in FIGS. 3 and 4 correspond to those of the components of the pneumatic spring vibration damper assembly unit according to the present invention which was described on the basis of FIGS. 1 and 2.

The fact that the essential elements of the vibration damper system, namely, the cylinder tube 6, the piston 9 as well as the drag bearing arrangement 13 have an oval or elliptical rather than round cross section represents an essential difference of the embodiment variants shown in FIGS. 3 and 4. Due to the novel shape of the cross section, the pivoting motion of the piston rod 8 is additionally increased in one plane compared to the round cross section of the cylinder tube 6 and the piston 9. This plane of pivoting is located in the area of the greatest extension of the elliptical or oval cross section of the cylinder tube.

It can be determined from the view in FIG. 3 that the dimensions of the cross section of the cylinder tube 6 together with the piston 9 located therein additionally expand in the lower area of the body-side assembly unit 5. This represents an additional enlargement of the pivoting area of the piston rod 8.

The view in FIG. 4 shows the piston rod together with the chassis-side assembly unit during its maximum deflecting motion within the plane of pivoting mentioned above in the area of the greatest extension of the cross section of the now ovally shaped cylinder tube. The rest of the design of the exemplary embodiment according to FIG. 4 corresponds essentially to the embodiment already shown in FIG. 2, so that no further, detailed explanation is given here.

The described shape according to the present invention, including the further special design features, guarantees in its entirety that, based on the possible angular mobility of the piston road, the vibration damper system 2 will respond easily. In addition, the pneumatic spring vibration damper assembly unit with its compact dimensions and its clear shape makes it possible to use it in a versatile manner for different requirements in motor vehicles.

While specific embodiments of the invention have been shown and described in detail to illustrate the application of the principles of the invention, it will be understood that the invention may be embodied otherwise without departing from such principles.

The invention claimed is:

1. A pneumatic spring vibration damper assembly unit for the suspension of wheels and chassis components of motor vehicles, the pneumatic spring vibration damper assembly unit comprising:
   a roll bellows, with a variable air chamber delimited by said roll bellows;
   a first assembly unit;
   a second assembly unit, said roll bellows being arranged between said first assembly unit, which is fixed on the body side and is provided with a vibration damper system, and a second assembly unit, which is fixed to the chassis of the motor vehicle and is able to move together with same;
   a cylinder tube;
   a piston;
   a piston rod, which connects the first, body-side assembly unit and the second, chassis-side assembly unit, and which is accommodated at a body-side free end by means of said piston in an interior space of said cylinder tube of the vibration damper system in a longitudinally displaceable manner, said piston rod being guided longitudinally displaceably within said cylinder tube of said vibration damper system in a drag bearing arrangement, which makes possible angular deflections of the longitudinal axis of the piston rod in relation to said central longitudinal axis of said cylinder tube; and
   a connecting element fixed to said piston rod and to said piston by means of a ball-and-socket joint each, is arranged between said piston rod and said piston.

2. A pneumatic spring vibration damper assembly unit in accordance with claim 1, wherein said drag bearing arrangement has a bearing inner part, which is provided with a continuous recess adapted to the cross section of said piston rod, with a round outer contour with varying cross section in the form of a concave outer shape, said bearing inner part is being surrounded by a bearing outer part with a corresponding concave inner recess adapted to the outer contour of said bearing inner part.

3. A pneumatic spring vibration damper assembly unit in accordance with claim 2, further comprising: a sealing element arranged in said continuous recess of said bearing inner part for guiding said piston rod.

4. A pneumatic spring vibration damper assembly unit in accordance with claim 3, wherein elastic sealing rings are arranged in two circular, groove-shaped depressions at the inner guide surface of said continuous recess.

5. A pneumatic spring vibration damper assembly unit in accordance with claim 2, further comprising at least one sealing element is arranged between said bearing inner part and said bearing outer part of said drag bearing arrangement.

6. A pneumatic spring vibration damper assembly unit in accordance with claim 5, wherein said sealing element is designed as an elastic sealing ring, which is arranged in a circular groove at the inner guide surface of said concave inner recess of said bearing outer part.

7. A pneumatic spring vibration damper assembly unit in accordance with claim 1, wherein at an end of said cylinder tube of said vibration damper system, which end faces said air chamber, said reach-through opening for said piston rod is provided with a sealing element with elastic sealing lips, wherein said elastic sealing lips are able to follow the pivoting motion of said piston rod from said central longitudinal axis of said cylinder tube as circular contact elements in contact with the surface of said piston rod.

8. A pneumatic spring vibration damper assembly unit in accordance with claim 1, wherein said bearing inner part of said drag bearing arrangement is made of plastic.

9. A pneumatic spring vibration damper assembly unit in accordance with claim 1, wherein said piston rod is accommodated at said second, chassis-side assembly unit in another drag bearing arrangement, which makes possible small angular deviations of said central axis of said piston rod at right angles to said plane of fastening of said chassis-side assembly unit.

10. A pneumatic spring vibration damper assembly unit in accordance with claim 9, wherein said another drag bearing arrangement is designed as a ball sleeve joint.

11. A pneumatic spring vibration damper assembly unit in accordance with claim 1, wherein the cross section of said cylinder tube with said piston located therein has an elliptical shape at least in one partial area of the longitudinal extension of said cylinder tube.

12. A pneumatic spring vibration damper assembly unit in accordance with claim 11, wherein said cylinder tube, said piston and said drag bearing arrangement have an elliptical cross section.

13. A pneumatic spring vibration damper assembly unit for a motor vehicle wheel and chassis component suspension, the pneumatic spring vibration damper assembly unit comprising:

a first assembly unit fixed on the body side of the motor vehicle;

a second assembly unit fixed to the chassis of the motor vehicle movable therewith;

a roll bellows defining a variable air chamber, said roll bellows being arranged operatively between said first assembly unit and said second assembly unit;

a cylinder tube connected to said first assembly unit;

a piston in an interior space of said cylinder tube and moveable therein in a longitudinally displaceable manner;

a piston rod;

a drag bearing arrangement, said piston rod being guided longitudinally displaceably within said cylinder tube of said vibration damper system in said drag bearing arrangement to make possible angular deflections of a longitudinal axis of the piston rod in relation to a central longitudinal axis of said cylinder tube; and a connecting element including a ball-and-socket joint at an end of said piston rod and a ball-and-socket joint carried by said piston, said connecting element being arranged between said piston rod and said piston.

14. A pneumatic spring vibration damper assembly unit in accordance with claim 13, wherein said drag bearing arrangement includes a bearing inner part with a continuous recess adapted to a cross section of said piston rod, said recess receiving said piston rod and with an outer contour surrounded by a bearing outer part with a recess adapted to the outer contour of said bearing inner part.

15. A pneumatic spring vibration damper assembly unit in accordance with claim 14, further comprising: a sealing element arranged in said continuous recess of said bearing inner part for guiding said piston rod and a sealing element arranged between said bearing inner part and said bearing outer part of said drag bearing arrangement.

16. A pneumatic spring vibration damper assembly unit in accordance with claim 1 further comprising a sealing element with elastic sealing lips, wherein said elastic sealing lips are able to follow the pivoting motion of said piston rod from said central longitudinal axis of said cylinder tube as circular contact elements in contact with the surface of said piston rod.

17. A pneumatic spring vibration damper assembly unit in accordance with claim 1, further comprising another drag bearing arrangement, said another drag bearing arrangement connecting said piston rod and said chassis-side assembly unit, allowing angular deviations of said central axis of said piston rod to a fastening plane of said chassis-side assembly unit.

18. A pneumatic spring vibration damper assembly unit in accordance with claim 17, wherein said another drag bearing arrangement comprises a ball sleeve joint.

19. A pneumatic spring vibration damper assembly unit in accordance with claim 13, wherein a cross section of said cylinder tube with said piston located therein has an elliptical shape at least in one partial area of the longitudinal extension of said cylinder tube.

20. A pneumatic spring vibration damper assembly unit in accordance with claim 19, wherein said cylinder tube, said piston and said drag bearing arrangement have an elliptical cross section.

* * * * *